May 7, 1929.  H. BIEDER  1,712,453

JIG

Filed Jan. 25, 1926

INVENTOR:
HERMAN BIEDER
BY
A. E. Merkel
ATTORNEY.

Patented May 7, 1929.

1,712,453

UNITED STATES PATENT OFFICE.

HERMAN BIEDER, OF CLEVELAND, OHIO.

JIG.

Application filed January 25, 1926. Serial No. 83,524.

My invention relates to jigs, and primarily to jigs used for drilling holes in metal objects.

The object of the invention is to provide a jig so constructed that a minimum wear on and hence longer life of the drill is produced, as a result of which the quality of the article drilled is enhanced, in consequence of the elimination of the burrs which are usually formed upon the drilled object.

The said invention involves primarily the introduction intermediately of the drill and the jig, of a metal softer than the drill and having a guiding aperture coaxial with the guiding aperture of the main jig member.

Heretofore it has been customary to make jigs or the bushings in jigs of this class of very hard steel, as such hardness is obviously necessary in order to secure accuracy in the drilling operation. These apertures are also necessarily very nearly the size of the drill and the latter therefore often, while being forced into alinement, comes in contact with the hard upper edge of the guiding aperture or the interior guiding surfaces of these apertures and its cutting edges become dulled in consequence. This dulling detracts from the efficiency and life of the drill and produces burrs at the farther end of the holes of the drilled object, whose removal involves expense and, hence, loss.

The said invention consists of means hereinafter fully described and particularly set forth in the claims.

The annexed drawing and the following description set forth in detail certain means for carrying out my invention, the disclosed means, however, constituting but one of the various mechanical forms in which the principle of my invention may be employed.

Figure 1:
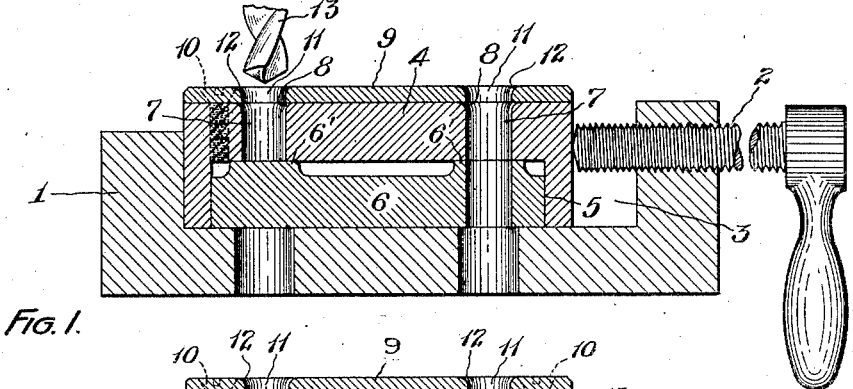
Figure 1 represents a cross-sectional view of a jig embodying my invention showing a piece of work in place, and a holder for securing the jig and piece of work while the latter is being drilled.

In the embodiment of my invention, illustrated by Fig. 1, a holder 1 of the usual construction is provided, having the clamping screw 2 and formed with the recess 3 adapted to receive the particular jig employed, which latter is clamped against the side walls of the holder by means of the said clamping screw 2.

The jig comprises two parts, a main or primary member 4 made of hard steel and formed with the bottom recess 5 for receiving and fitting the particular piece of work to be drilled, in this instance shown to be a rectangular block 6 provided with two bosses 6'—6', through which it is required to drill parallel holes.

This main or primary member is provided with two guiding apertures 7—7, whose axes are parallel and perpendicular to the face of the jig, the upper ends of these apertures being preferably flared as at 8. This primary member is made of hard steel so that the interior of the guiding apertures 7—7 present hard steel surfaces. Secured to the upper face of the primary member 4 of the jig is a plate 9 made of metal softer than that usually employed for a drill, such as, for instance, brass. This plate or secondary jig member is fixedly secured to the primary member by means of suitable screws 10—10. This secondary member is furthermore provided with two guiding apertures 11—11 preferably flared at their outer ends as at 12, these apertures being coaxial with and of the same diameter as the guiding apertures 7—7.

When the above-described device is utilized, the holder with the described parts attached thereto is placed in suitable position beneath the drill 13 by hand and as nearly as possible in alinement with the aperture over the place to be drilled as is the usual custom. The drill is then rotated by suitable means (not shown) and then lowered to engage the guiding aperture 11 which is immediately beneath it. The end of the drill, therefore, if out of exact alinement first comes in contact with the soft guiding surface of the secondary member and by its contact therewith accurately alines the jig beneath such drill. By the time, therefore, that the latter reaches the hard guiding surface of the aperture 7 it will be in perfect alinement and hence not come in contact with the upper edge of such hard surface. By further depressing the drill, the required hole is made in the work 6 and the above operation is repeated in drilling the other holes, as will be readily understood.

Figure 3:
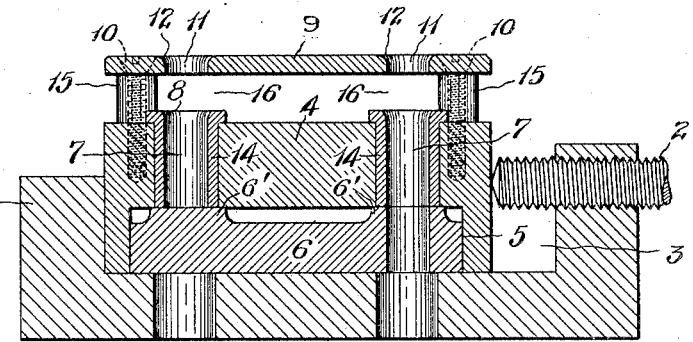
Fig. 3 represents a view similar to that of Fig. 1 showing a modified form.

In Fig. 3, I have shown the main or primary member 4 which may be of ordinary steel provided with the bushings 14 which are made of steel of the required hardness and whose apertures 7 form the hard guiding surfaces. Instead of placing the secondary member 9 in direct contact with the upper face of the bushing, it is secured in place by screws but is held away from the primary member by means of separators 15, thereby forming a space 16 between the primary and secondary members, whereby chips may be readily removed laterally during the drilling operation.

Figure 4:
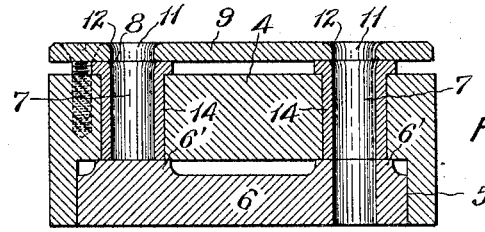
Figs. 4 and 5 represent cross-sectional views of still further modifications of the jig.

In Fig. 4 I have shown a jig construction similar to that shown in Fig. 3, but instead of being held away from the upper surface of the primary member by separators, the secondary member rests directly upon the upper ends of the bushings 14.

Figure 2:
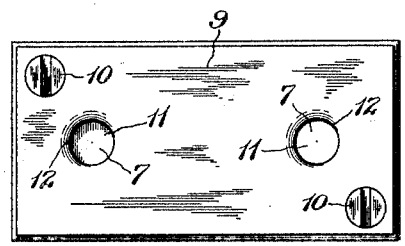
Fig. 2 represents a plan of the jig shown in Fig. 1.
Figure 5:
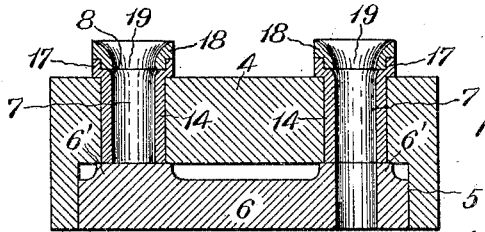

In Fig. 5 I have shown another way of securing the required general result, which consists in providing bushings 14, such as are shown in Figs. 3 and 4, the said bushings, however, being each provided with a flange 17 which receives the reduced end of a soft metal sleeve 18 having a bore 19 of the same diameter as the inner bore of the bushings and flared at its upper end. In this case a multiplicity of secondary soft metal guiding members is provided, instead of one, as shown in Figs. 1 and 2, the principle involved, however, being the same.

Figure 6:
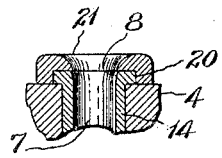
Fig. 6 represents a fragmentary cross-section of a further modification.

In Figure 6 I have shown a modification of the construction shown in Fig. 5 in which I employ a bushing similar to those shown in Figs. 3 and 4, and separate secondary members each of which is provided with a lower recess 20 for receiving the upper or flange end of the bushings. These sleeves are made of soft metal as in the case of the other and previously described secondary members and provided with flared apertures 21.

As before stated, I have found that by the use of this intermediate soft metal member which receives the first contact of the drill, the latter is prevented from coming into contact with the hard guiding surface of the jig, before the drill is alined accurately therewith. This has resulted, in actual experience, of a greatly increased life of the drill without sharpening and has also resulted in the substantial elimination of burrs at the lower or farther end of the holes drilled in the work.

The term "primary member" as herein used is to be interpreted as the main member of the jig and which is placed and is directly in contact with the article to be drilled.

What I claim is:

1. In a jig, the combination of a main member provided with a guiding aperture whose guiding surface is made of hard steel; of a secondary member fixedly mounted with respect to said main member and provided with a guiding aperture whose guiding surface is made of metal softer than that of an ordinary drill and which is coaxial with and substantially of the same diameter as said first-named aperture.

2. In a jig, the combination with a main member provided with a guiding aperture whose guiding surface is made of hard steel; of a secondary member disposed outside of said main member, fixed to the latter, and having a guiding aperture whose guiding surface is made of soft metal such as brass, said apertures being coaxial.

3. In a jig, the combination with a main member comprising a body portion having an aperture passing therethrough, and a steel bushing in such aperture whose interior forms a guiding surface for a drill; of a secondary member associated with and fixed respectively to said bushing and having a guiding aperture of substantially the same diameter and coaxial with the aperture of said bushing; said secondary member being made of soft metal such as brass.

4. In a jig, the combination with a main member comprising a body portion having an aperture passing therethrough, and a steel bushing in such aperture whose interior forms a guiding surface for a drill; of a secondary member in the form of a bushing fixed exteriorly of said body portion to an end of the first-named bushing and made of soft metal such as brass.

5. In a jig, the combination with a main member provided with a cylindrical hole passing therethrough whose surface is formed of hard steel; of a secondary member fixedly mounted with respect to and above said main member and having a cylindrical hole therein coaxial with the hole of said main member and whose lower end portion has a diameter equal to that of the hole in the main member; said secondary member being made of metal materially softer than that of an ordinary drill.

Signed by me this 16 day of January, 1926.

H. BIEDER.